Patented May 4, 1926.

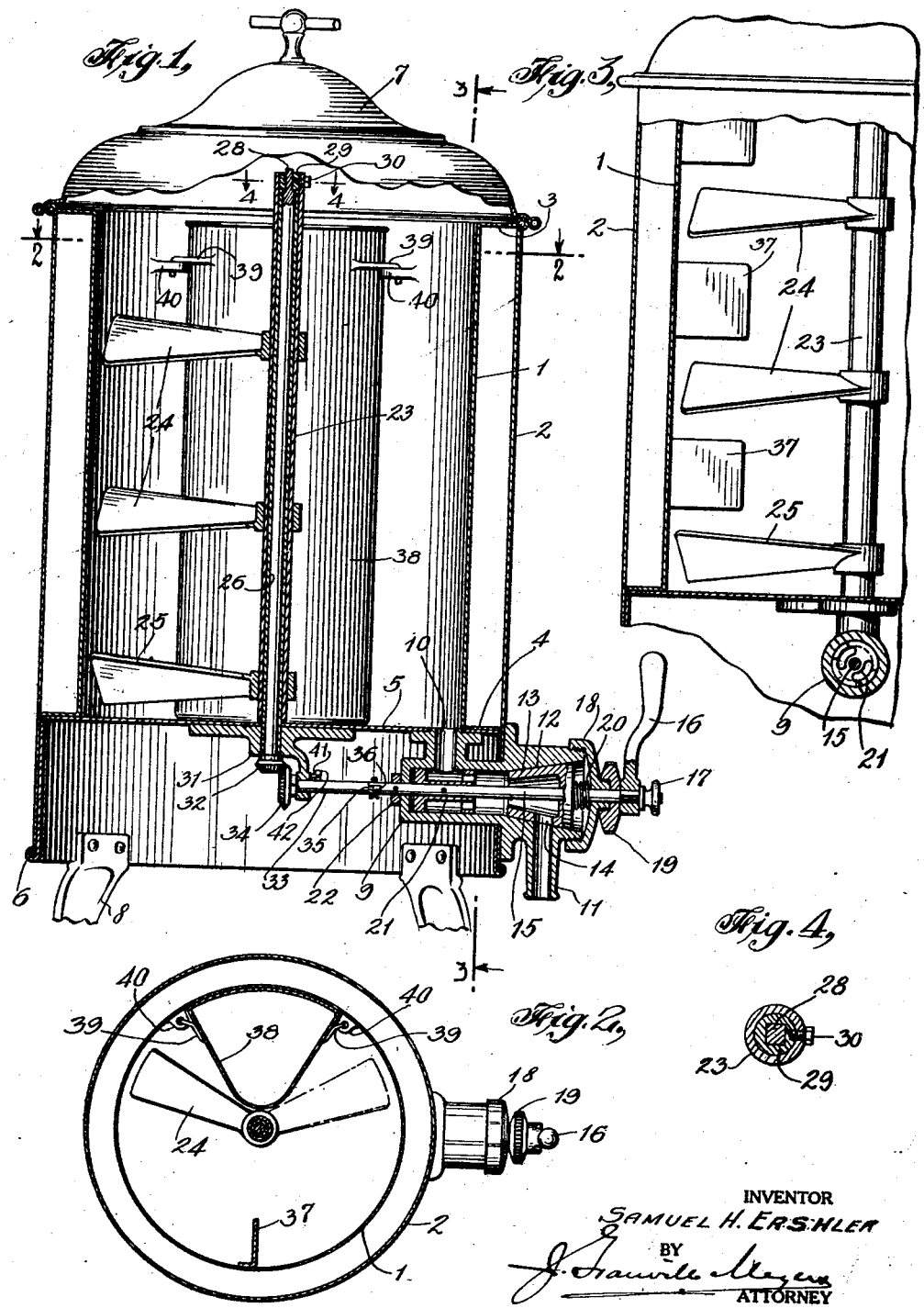

1,583,539

UNITED STATES PATENT OFFICE.

SAMUEL H. ERSHLER, OF WEEHAWKEN, NEW JERSEY, ASSIGNOR TO S. BLICKMAN, INC., OF WEEHAWKEN, NEW JERSEY, A CORPORATION OF NEW YORK.

BEVERAGE-DISPENSING VESSEL.

Application filed April 24, 1925. Serial No. 25,588.

*To all whom it may concern:*

Be it known that I, SAMUEL H. ERSHLER, a citizen of the United States, and resident of Weehawken, in the county of Hudson and State of New Jersey, have invented certain new and useful Improvements in Beverage-Dispensing Vessels, of which the following is a specification.

This invention is an improvement in beverage dispensing vessels, and more particularly in the type of vessels used in restaurants and cafés.

Beverages such as milk, cocoa, and the like, which are usually emulsions, tend to separate into their several constituents, when left undisturbed, those of higher specific gravity, as for instance the butter fats in milk rising toward the surface, while those of lower specific gravity settle to the bottom.

In milk dispensing vessels of the type in question, the contents of the vessel are usually withdrawn through a valve or faucet at the bottom, and the quantities withdrawn at successive intervals of time differ widely in content of food constituents.

The portions first withdrawn, may be of substantially uniform and standard quality, but those portions later withdrawn fall below the standard, while the portions last withdrawn have an abnormal content of such constituents, as for instance butter fats in milk.

The characteristic tendency of the emulsion may be controlled to some degree by temperature conditions and by agitation. While the temperature conditions are designed to retard the separation of the constituents, the agitation is for the purpose of renewing the emulsion, and it is obvious that the agitation must be neither too violent nor too long in duration. Thorough mixing repeated at frequent intervals gives the best results.

The primary purpose of the agitation is to remix, and re-emulsify the liquid, and since the effects of each agitation are more or less evanescent, it will be evident that agitation at the moment of dispensing will best serve the purpose.

A primary object of the present invention is the provision of mechanism in connection with dispensing vessels of the character in question, for thoroughly agitating the contents of the vessel, immediately prior to each withdrawal of a portion thereof, controlled to operate by such withdrawal.

Another object is the provision of agitating mechanism of a character such that while the contents of the vessel are thoroughly remixed, the remixing is without excessive violence, and with a minimum of surface disturbances.

Another object is the provision of mechanism of a character such that no harbor is offered for the retention of impurities, and which may be easily removed for cleaning.

With these and other objects in view, the invention consists in the construction and novel combination of parts fully described hereinafter, illustrated in the accompanying drawings, and pointed out in the claims appended hereto, it being understood that various changes in the form, proportion, size and minor details of construction within the scope of the claims, may be resorted to without departing from the spirit of the invention.

In the drawings:—

Fig. 1 is a vertical section of a beverage dispensing vessel embodying the invention.

Figs. 2, 3, and 4 are sections on the lines 2—2, 3—3, and 4—4 respectively, of Fig. 1.

The present embodiment of the invention is shown in connection with a beverage dispensing vessel, comprising an inner wall 1 and an outer wall 2, spaced apart from the inner wall to provide a jacket or chamber, for the reception of a suitable heat insulating material, as for instance cork. The upper and lower ends of the inner wall are flanged outwardly as shown at 3 and 4 respectively, to abut the outer wall, and close the chamber or jacket between the walls. The bottom 5 is inverted cup shaped, the body thereof abutting the flange 4, while the side wall thereof fits within the lower end of the outer wall, and the registering lower edges of the bottom and outer wall are beaded together as shown at 6. A suitable cover 7 is provided for closing the vessel, and legs 8 may be connected with the vessel to support the same.

The contents of the vessel are withdrawn through an opening in the bottom 5, and a valve casing 9 is connected with the vessel at this point, the casing having a lateral port 10 communicating with the opening in the bottom of the vessel. The body of the casing which is radial to the vessel extends through the outer wall and the side portion of the bottom, below the body of the bottom, and is provided with a discharge nozzle 11 outside the vessel.

The bore of the casing outside the vessel is flaring as shown at 12, and a frusto-conical valve 13 fits within this flaring portion. The inner end of the valve is open, and it has a lateral port 14 adapted to register with the discharge nozzle 11. The valve is feathered to a valve stem or shaft 15, which extends through the casing 9, and is provided with a handle 16 at its outer end.

As shown in Fig. 1, the outer end of the shaft or stem is polygonal, and the handle 16 has a similarly shaped opening to receive the polygonal portion. A thumb nut 17 is threaded onto the stem to hold the handle in place.

A cap 18 is threaded onto the outer end of the casing for closing the same, the cap having a central boss through which the stem extends, and a packing nut 19 is threaded onto the boss between the cap and the handle. As previously stated, the frusto-conical valve 12 is feathered onto the stem, to rotate therewith, but to have some longitudinal movement with respect thereto. A coil spring 20 encircles the stem, between the outer closed end of the valve and the cap, and acts normally to press the valve to its seat.

A spool shaped member 21 is secured to the valve, within the cylinder portion of the bore of the casing 9, the flanges of the spool shaped member being on opposite sides of the port 10, and the outer flange is perforated as shown to permit free flow of the contents of the vessel. A stop collar 22 is pinned to the shaft at the inner end of the casing 9 to prevent outward movement thereof, and the inner end of the stem is adapted for connection with the agitating mechanism to be described.

Said mechanism includes a sleeve 23, which carries a set of agitating blades 24 and 25, the said blades extending radially from the sleeve at regular intervals, and substantially parallel with each other. The planes of the blades are inclined with respect to the horizontal, and the lower blade 25 is inclined in the opposite direction to the two upper blades 24, so that the blades 24 and 25 when moving through the liquid, tend to drive in opposite directions, thereby to thoroughly mix the same.

The sleeve 23 fits outside of a tubular member 26, which is arranged axially of the vessel, and secured to the bottom with a fluid tight joint, the bottom having an opening in register with the bore of the tubular member. A shaft 27 is journaled in the tubular member, and the upper end of the shaft is polygonal as shown at 28 to fit within a similarly shaped socket 29 held in the upper end of the sleeve 23. As shown in Fig. 1, the socket is held in place by a set screw 30.

The lower end of the shaft 27 extends through a bracket 31 secured to the bottom of the vessel, and is provided with a miter gear 32 below the bracket. A stub shaft 33 is journaled in the bracket, and the shaft has a miter gear 34 meshing with the gear 32. The adjacent ends of the shafts 15 and 33, are provided with interlocking means, to constrain the stub shaft to rotate with the valve stem or shaft, and the said means may be of any suitable construction. In the present instance it is constituted by an axial tenon 35 on the stop shaft, fitting within an axial mortise 36 on the shaft 15. A cotter pin may be passed through the engaging parts if desired.

In order to provide some counter-pressure against the action of the blades 24 and 25, which would otherwise tend to move the liquid contents of the vessel bodily, vanes 37 are secured to the inner wall, the said vanes extending radially into the vessel and being in the same vertical plane. It will be evident that when the blades 24—25 are moved circumferentially of the vessel, from the full line position of Fig. 2, to the dotted line position, the vanes will provide counter-pressure, and will assist in the agitating action of the blades.

An ice chamber 38 is removably mounted in the vessel, directly opposite the vanes. This chamber extends from top to bottom of the vessel, and is designed to hold ice, for cooling the liquid contents of the vessel. It is held in place by means of hooks 39 near the top of the chamber, which engage perforated lugs 40 on the inner wall. The vessel as shown is substantially triangular in cross section.

It is desirable to limit the movement of the valve 13 to full open position, and to so arrange the parts, that in full open position, the blades are just out of contact with the ice chamber, as for instance in the full line position of Fig. 5, and to limit the closing movement of the valve to a symmetrical position at the opposite side of the chamber. With this object in view, stops 41 are provided on the bracket 31, for engagement by a lug 42 on the stub shaft, and the stops prescribed the extent of angular movement of the handle, the valve, and the sleeve 23.

In operation, when a portion of the beverage is withdrawn, the movement of the handle 16 to open the valve, swings the blades 25 from the full line position of Fig. 2 to the dotted line position, thoroughly agitating the contents of the vessel, and the agitation takes place just prior to the withdrawal. Thus thorough agitation of the vessel's contents is provided for at frequent intervals, and at the most opportune moments.

The blades including the sleeve 23 may be easily removed for cleaning, merely by lifting the sleeve away from the tubular member and shaft. The parts of the valve are also easily dismounted. When the cap 18 is released from the valve casing, the valve stem, the valve 13, and the spool shaped member may all be withdrawn, after the stop collar 22 is released, and this collar is held to the stem by a cross key or cotter pin as shown.

I claim:

1. A beverage dispensing vessel having axially arranged stirring mechanism including circumferentially movable blades or vanes, an ice chamber detachably held in the vessel on the wall thereof, and extending longitudinally thereof, a draw-off including a valve provided with a handle for operating the same, a driving connection between the valve and the stirring mechanism for operating the same when the valve is operated, and means to limit the movement of the valve in opposite directions to prevent contact of the blades or vanes with the ice chamber.

2. A beverage dispensing vessel having rotatable stirring means at the axis of the vessel, including blades or vanes to sweep circumferentially thereof, an ice chamber detachably held in the vessel and extending longitudinally thereof, and means to limit the swinging movement of the stirring means in both directions, prior to the engagement of the blades or vanes with the ice chamber.

3. A beverage dispensing vessel having axially arranged stirring mechanism, and a draw-off including a casing having a tapering seat and a lateral discharge from the seat, a tapering valve engaging the seat and having a lateral port, the outer end of the valve closed, an axial valve stem having a driving connection with the stirring mechanism, the valve slidable longitudinally thereof, and constrained to rotate therewith, a cap through which the stem extends connected with the casing, and a spring arranged between the cap and the valve, for holding the valve to its seat.

Signed at Weehawken, in the county of Hudson and State of New Jersey this 20th day of April, A. D. 1925.

SAMUEL H. ERSHLER.